(12) United States Patent
Raafat et al.

(10) Patent No.: US 8,812,575 B2
(45) Date of Patent: Aug. 19, 2014

(54) DECIMAL FLOATING-POINT SQUARE-ROOT UNIT USING NEWTON-RAPHSON ITERATIONS

(75) Inventors: Ramy Raafat, Cairo (EG); Amira Mohamed, Cairo (EG); Hossam Ali Hassan Fahmy, Cairo (EG); Yasmeen Farouk, Cairo (EG); Mostafa Elkhouly, Cairo (EG); Tarek Eldeeb, Cairo (EG); Rodina Samy, Cairo (EG)

(73) Assignee: SilMinds, LLC, Egypt, Cairo (EG)

( * ) Notice: Subject to any disclaimer, the term of this patent is extended or adjusted under 35 U.S.C. 154(b) by 505 days.

(21) Appl. No.: 13/177,488

(22) Filed: Jul. 6, 2011

(65) Prior Publication Data
US 2012/0011182 A1    Jan. 12, 2012

Related U.S. Application Data

(60) Provisional application No. 61/361,552, filed on Jul. 6, 2010.

(51) Int. Cl.
*G06F 7/552*    (2006.01)

(52) U.S. Cl.
USPC ........................................... 708/500

(58) Field of Classification Search
None
See application file for complete search history.

(56) References Cited

U.S. PATENT DOCUMENTS

| | | | |
|---|---|---|---|
| 5,515,308 A * | 5/1996 | Karp et al. | 708/500 |
| 6,240,433 B1 * | 5/2001 | Schmookler et al. | 708/270 |
| 7,136,893 B2 | 11/2006 | Carlough et al. | |
| 8,166,092 B2 * | 4/2012 | Kamoshida | 708/504 |
| 2008/0288571 A1 * | 11/2008 | Kamoshida | 708/500 |
| 2012/0011181 A1 * | 1/2012 | Samy et al. | 708/204 |
| 2012/0011182 A1 * | 1/2012 | Raafat et al. | 708/205 |
| 2012/0011187 A1 * | 1/2012 | Mohamed et al. | 708/523 |

OTHER PUBLICATIONS

Wang, Liang-Kai and Schulte, M.J., "Decimal Floating-Point Square Root Using Newton-Raphson Iteration," Application-Specific Systems, Architecture Processors (ASAP), 2005, 16th IEEE International Conference, Jul. 2005, 7 pages.

* cited by examiner

*Primary Examiner* — David H Malzahn
(74) *Attorney, Agent, or Firm* — Osha Liang LLP

(57) ABSTRACT

A system including: an input processing unit configured to: extract a significant and a bias exponent from the decimal floating-point radicand; and calculate a normalized significand; a square root unit configured to: calculate, using a FMA unit, a refined reciprocal square-root of the normalized significand; calculate an unrounded square-root of the normalized significand by multiplying the refined reciprocal square-root by the normalized significand; and generate a rounded square-root based on a first difference between the normalized significand and a square of the unrounded square-root; a master control unit operatively connected to the input processing hardware unit and the square-root hardware unit and configured to calculate an exponent for the unrounded square-root based on the number of leading zeros and a precision of the decimal floating-point radicand; and an output formulation unit configured to output a decimal floating-point square-root of the radicand based on the rounded square-root and the exponent.

20 Claims, 8 Drawing Sheets

| Guard Digit | Remainder | NotExact | RN | RPI, RAZ | RMI, RTZ |
|---|---|---|---|---|---|
| 0 | 0 | 0 | $Q_R = Q''$ | $Q_R = Q''$ | $Q_R = Q''$ |
| 0 | 0 | 1 | $Q_R = Q''$ | $Q_R = Q''$ | $Q_R = Q'' - 1$ |
| 0 | + | X | $Q_R = Q''$ | $Q_R = Q'' + 1$ | $Q_R = Q''$ |
| <5 | X | X | $Q_R = Q''$ | $Q_R = Q'' + 1$ | $Q_R = Q''$ |
| 5 | 0 | X | $Q_R = Q''$ | $Q_R = Q'' + 1$ | $Q_R = Q''$ |
| 5 | + | X | $Q_R = Q'' + 1$ | $Q_R = Q'' + 1$ | $Q_R = Q''$ |
| >5 | X | X | $Q_R = Q'' + 1$ | $Q_R = Q'' + 1$ | $Q_R = Q''$ |

Rounding Table 400

X = Don't Care

FIG. 4

Radicand = +302500000000E-322 & round mode = round to nearest even

Normalized Significand ($S_N$) = 0.3025000000000000

Example 1 605

Initial Reciprocal Square Root ($X_0$) = 1.818181
Refined Reciprocal Square Root ($X_2$) = 1.818181818181819

Unrounded Square Root (Q) = $X_2 \cdot S_N$ = 0.5500000000000002470000000000000000

Exponent = floor(-322/2) = -166 => numerator is even so Q' = Q

Sticky bit = 1, thus Q" = Q' + bias = 0.550000000000001

The guard digit is "1" and round mode is round to nearest even:
$Q_R$ = 0.55000000000000

The result is then shifted by the difference between the half number of trailing zeros in the input radicand (8/2 = 4) and the number of trailing zeros in QR (12), so the result will be shifted to the right by (12-4) 8 digits.

Square-Root of Radicand = +550000E-166

---

Radicand = +56973200327700E29 & round mode = round to positive infinity

Normalized Significand ($S_N$) = 0.5697320032770000

Example 2 610

Initial Reciprocal Square Root ($X_0$) = 1.324843
Refined Reciprocal Square Root ($X_2$) = 1.32484384439178272

Unrounded Square Root (Q) = $X_2 \cdot S_N$ = 75480593749453243070291197344000000

Exponent = floor(29/2) = 14 => numerator is odd:
Q' = Q $\cdot \sqrt{10}$ = 2.3869059539014099950786417649839788827

Sticky bit = 1, thus Q" = Q' + bias = Q' + 10E-17 = 2.3869059539014100

The guard digit is "0" and round mode is round to positive infinity:
$Q_R$ = 2.3869059539014100

Right shift amount = 0

Square-Root of Radicand = +2386905953901410E16

FIG. 6

DECIMAL FLOATING-POINT SQUARE-ROOT UNIT USING NEWTON-RAPHSON ITERATIONS

CROSS-REFERENCE TO RELATED APPLICATIONS

This application is a non-provisional patent application of U.S. Provisional Patent Application No. 61/361,552, filed on Jul. 6, 2010, and entitled: "A Decimal Square-Root Unit using Newton-Raphson Iterations." Accordingly, this non-provisional patent application claims priority to U.S. Provisional Patent Application No. 61/361,552 under 35 U.S.C. §119(e). U.S. Provisional Patent Application No. 61/361,552 is hereby incorporated in its entirety.

The present application also contains subject matter that may be related to the subject matter in U.S. application Ser. No. 13/177,491 entitled: "Parallel Redundant Decimal Fused-Multiply-Add Circuit", and filed on Jul. 6, 2011. All mentioned U.S. applications are hereby incorporated by reference in their entirety.

BACKGROUND

Decimal arithmetic has a growing need in many commercial applications, financial applications, green energy applications, billing applications, and database systems where binary arithmetic is not sufficient because of the inexact mapping between some decimal and binary numbers. For example, the decimal number 0.1 does not have an exact binary representation. Moreover, decimal arithmetic is the norm of the human calculations.

SUMMARY OF INVENTION

In general, in one aspect, the invention relates to a method. The method comprises: extracting a significand and a biased exponent from a decimal floating-point radicand; generating a normalized significand based on a number of leading zeros in the significand; calculating, using a redundant decimal fused-multiply and add (FMA) unit, a refined reciprocal square-root of the normalized significand using a plurality of Newton-Raphson iterations; calculating, using the redundant decimal FMA unit, an unrounded square-root of the normalized significant by multiplying the refined reciprocal square-root by the normalized significant; generating a rounded square root based on a first difference between the normalized significand and a square of the unrounded square-root calculated using the redundant decimal FMA unit; calculating an exponent for the unrounded square-root based on the number of leading zeros, a bias of the decimal floating-point radicand, and a precision (p) of the decimal floating-point radicand; and outputting a decimal floating-point square-root of the radicand based on the rounded square root and the exponent.

In general, in one aspect, the invention relates to a system. The system comprises: an input processing hardware unit configured to: extract a significand and a bias exponent from the decimal floating-point radicand; calculate a normalized significand from the significand; and calculate an initial reciprocal square-root of the normalized significand; a square root hardware unit comprising a redundant decimal fused-multiply and add (FMA) unit and configured to: calculate, using the redundant decimal FMA unit, a refined reciprocal square-root of the normalized significand using a plurality of Newton-Raphson iterations; calculate, using the redundant decimal FMA unit, an unrounded square-root of the normalized significand by multiplying the refined reciprocal square-root by the normalized significand; and generate a rounded square-root based on a first difference between the normalized significand and a square of the unrounded square-root calculated using the redundant decimal FMA unit; a master control hardware unit operatively connected to the input processing hardware unit and the square-root hardware unit and configured to calculate an exponent for the unrounded square-root based on the number of leading zeros, a bias of the decimal floating-point radicand, and a precision (p) of the decimal floating-point radicand; and an output formulation hardware unit configured to output a decimal floating-point square-root of the radicand based on the rounded square-root and the exponent.

Other aspects of the invention will be apparent from the following description and the appended claims.

BRIEF DESCRIPTION OF DRAWINGS

FIG. 4 shows a table in accordance with one or more embodiments of the invention.

FIG. 6 shows examples in accordance with one or more embodiments of the invention.

DETAILED DESCRIPTION

Figure 1:
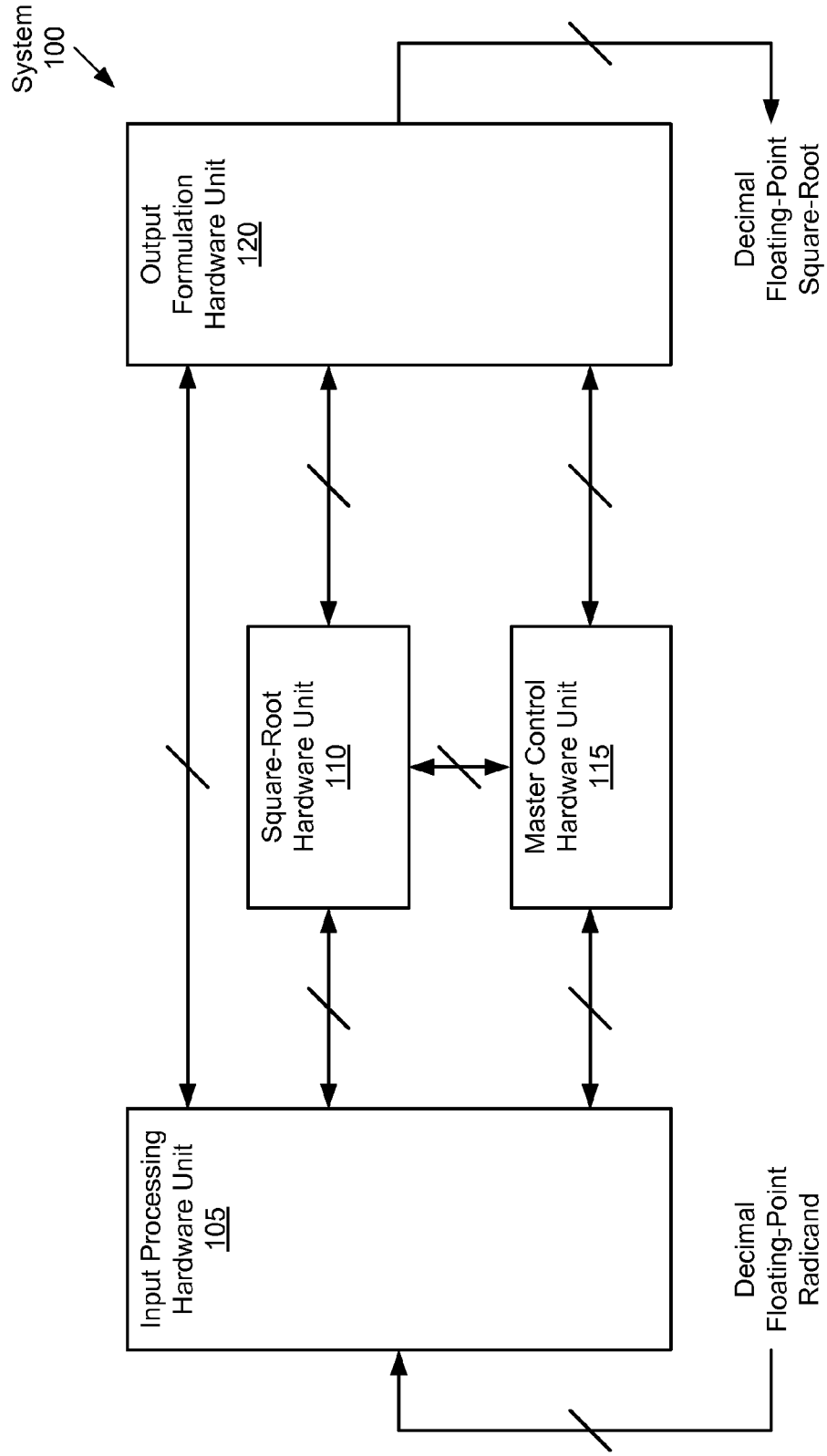
FIG. 1 shows a block diagram depicting a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for calculating the square root of a decimal floating-point radicand. Once the significand of the decimal floating-point radicand is normalized, a refined reciprocal square root of the normalized significand is calculated by executing multiple Newton-Raphson iterations using a redundant decimal fused-multiply and add (FMA) unit. Specifically, within the redundant decimal (FMA) unit, the multiplicand of each cycle/stage in an iteration is adjusted to be in a non-redundant form, while the multiplier is obtained from a feedback path and kept in a redundant form (i.e., carry save format). The refined reciprocal square root is multiplied with the normalized significand, and the resulting square root is rounded and formatted before being outputted as a decimal floating-point value.

FIG. 1 shows a system (100) in accordance with one or more embodiments of the invention. The system (100) inputs a decimal floating-point radicand and outputs a decimal floating-point square-root of the radicand. As shown in FIG. 1, the system (100) has multiple components including an input processing hardware unit (105), a square-root hardware unit (110), a master control hardware unit (115), and an output formulation hardware unit (120). One or more of the hardware components (105, 110, 115, 120) may be embedded within one or more general purpose processor cores, field programmable gate arrays (FPGAs), and/or application specific integrated circuits (ASICs).

In one or more embodiments of the invention, decimal floating-point representations divide a number (e.g., radicand, square-root of radicand) into a sign, a biased exponent, and a significand. The quantity of bits required to represent the number depends on the specific decimal floating-point format being implemented. For example, 64 bits are required for the decimal64 format, while 128 bits are required for the decimal128 format. The precision (p) of a decimal floating-point format corresponds to the size, in decimal digits, of the significand. For example, the decimal64 format includes a significand that is 16 decimal digits in size. Accordingly, the precision of the decimal64 format is 16 (i.e., p=16). Similarly, the decimal128 format includes a significand that is 34 decimal digits in size. Accordingly, the precision of the decimal128 format is 34 (i.e., p=34). Further, decimal floating-point formats may also be used to represent positive and negative infinity, and special "not a number" (NaN) values. In one or more embodiments of the invention, the decimal floating-point radicand conforms with the IEEE Std 754-2008 decimal format.

In one or more embodiments of the invention, the input processing hardware unit (105) is configured to: extract the significand (S) and the biased exponent from the decimal floating-point radicand; convert the significand and biased exponent to binary coded decimal (BCD) format; normalize the significand ($S_N$); and select/calculate an initial reciprocal square-root for the normalized significand (i.e., $1/\sqrt{S_N}$). The input processing hardware unit (105) may further be configured to detect if the decimal floating-point radicand is a special value (e.g., positive infinity, negative infinity, NaNs, etc.) and forward the corresponding special square-root result to the output formation hardware unit (120).

Figure 2A:
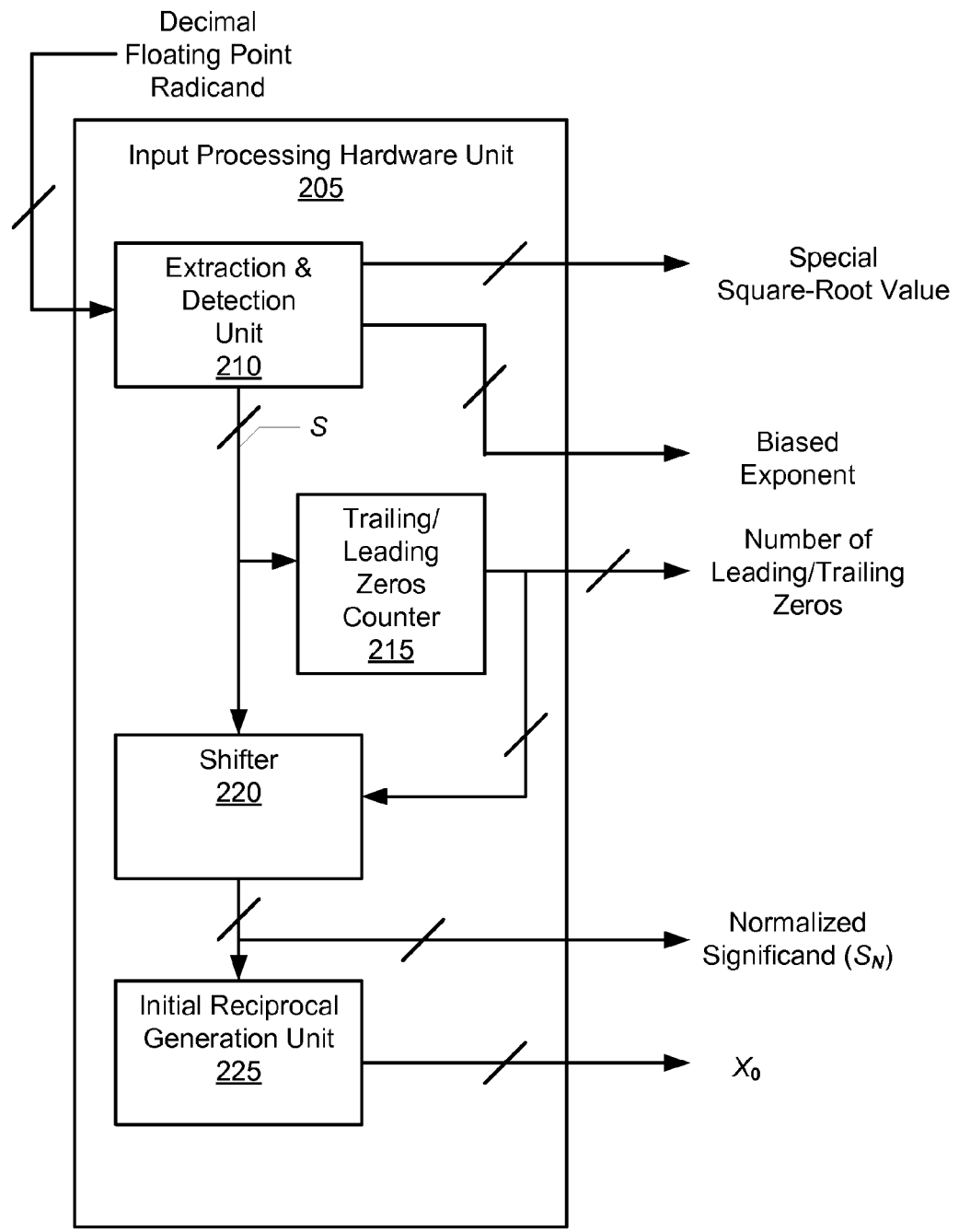
FIG. 2A shows a block diagram depicting an input processing hardware unit in accordance in one or more embodiments of the invention.

FIG. 2A shows an input processing hardware unit (205) in accordance with one or more embodiments of the invention. The input processing hardware unit (205) is an example implementation of the input processing hardware unit (105), discussed above in reference to FIG. 1. As shown in FIG. 2A, the input processing hardware unit (205) includes an extraction & detection unit (210), a trailing/leading zeros counter (215), a shifter (220), and an input reciprocal generation unit (225).

In one or more embodiments of the invention, the extraction & detection unit (210) is configured to extract the significand (S) and the biased exponent from the decimal floating-point radicand and convert the significand and the biased exponent to binary coded decimal (BCD) format. The biased exponent may be forwarded to the master control hardware unit (115), discussed above in reference to FIG. 1. The extraction & detection unit (210) is also configured to detect if the decimal floating-point radicand is a special value, and forward the corresponding special square-root value to the output formulation hardware unit (120), discussed above in reference to FIG. 1.

In one or more embodiments of the invention, the trailing/leading zeros counter (215) is configured to count the number of leading and/or trailing zeros in the significand (S) and the shifter (220) is configured to normalize the significand based on the number of leading zeros identified by the trailing/leading zeros counter (215). Specifically, the shifter (220) is configured to calculate a normalized significand ($S_N|0.1 \leq S_N < 1.0$) by left shifting the significand (S) by the number of leading zeros. The number of leading and/or trailing zeros and the normalized significand ($S_N$) may be forwarded to the master control hardware unit (115) and the square-root hardware unit (110), respectively, discussed above in reference to FIG. 1.

In one or more embodiments of the invention, the initial reciprocal generation unit (225) is configured to generate an initial reciprocal square-root of the normalized significand ($X_0 = 1/\sqrt{S_N}$). In one or more embodiments of the invention, the initial reciprocal square-root of the normalized significand ($X_0$) is calculated by multiplying $C' = [A_M + (\tfrac{2}{3}) E(-k)]^{(-3/2)}$ by $B' = A_M + $ nine's complement of $A_L/2$, where $A_M$ is the k most significant digits of the normalized significand, and where $A_L$ is the (p–k) least significant digits of the normalized significand. The initial reciprocal square-root of the normalized significand ($X_0$) may be forwarded to the square-root hardware unit (110), discussed above in reference to FIG. 1. Those skilled in the art, having the benefit of this detailed description, will appreciate that there exists multiple methods for obtaining/generating an initial square-root of the normalized significand.

Figure 2B:
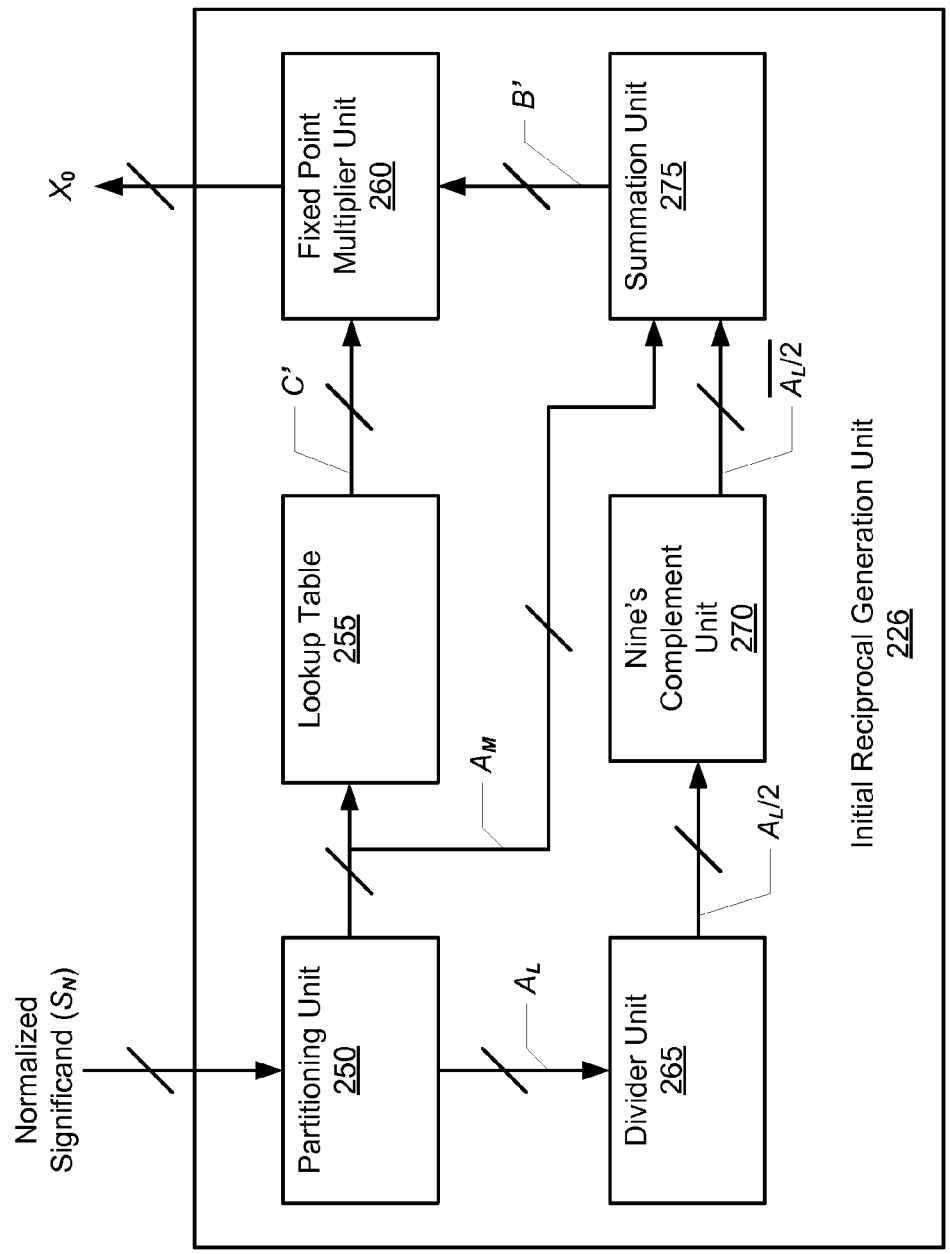
FIG. 2B shows a block diagram depicting an initial reciprocal generation unit in accordance with one or more embodiments of the invention.

FIG. 2B shows an initial reciprocal generation unit (226) in accordance with one or more embodiments of the invention. The initial reciprocal generation unit (226) is an example implementation of the initial reciprocal generation unit (225), discussed above in reference to FIG. 2A. As shown in FIG. 2B, the initial reciprocal generation unit (225) includes a partitioning unit (250), a lookup table (255), a fixed point multiplier unit (260), a divider unit (265), a nine's complement unit (270), and a summation unit (275).

In one or more embodiments of the invention, the partitioning unit (250) is configured to partition the normalized significand ($S_N$) into its k most significant digits ($A_M$) and its (p–k) least significant digits ($A_L$). The divider unit (265) is configured to halve the value corresponding to the (p–k) least significant digits ($A_L/2$), and the nine's complement unit (270) is configured to output the nine's complement of one-half the value corresponding to the (p–k) least significant digits. The summation unit (275) is configured to calculate B' by adding the output of the nine's complement unit (270) with the value corresponding to the k most significant digits ($A_M$).

In one or more embodiments of the invention, the lookup table (255) is indexed by the k most significant digits of the normalized significand ($A_M$). In other words, C' is obtained from the lookup table (255), and the lookup table (255) is accessed using the k most significant digits of the normalized significand ($A_M$). The fixed point multiplier unit (260) is configured for multiplying C' and B'. Those skilled in the art, having the benefit of this detailed description, will appreciate that C' has 2k digits and multiplication of C' by B' provides 2k–1 accurate digits of the initial reciprocal square-root.

In one or more embodiments of the invention, densely packed decimal (DPD) encoding is used to index the lookup table (255) to save over 75% of the memory space compared to BCD encoding. With every 10 bits representing 3 digits and each entry in the lookup table (255) holding a value with 2k digits, the lookup table (255) has a size of $2^{\lceil (k \cdot 10)/3 \rceil} \times (2k \cdot 4)/8$ bytes. In one or more embodiments of the invention, k=4. However, k may take any value.

Referring back to FIG. 1, in one or more embodiments of the invention, the master control hardware unit (115) is configured to calculate the exponent of the preliminary square root (i.e., the exponent for the unrounded square-root) based on the number of leading zeros in the significand and the input biased exponent obtained from the input processing hardware unit (105). Specifically, the master control hardware unit (115) calculates the exponent of the preliminary square-root by the following:

$$EPS = \left\lfloor \frac{E_B - LZC + \text{bias} - p}{2} \right\rfloor, \qquad (1)$$

where EPS is the exponent of the preliminary square-root, $E_B$ is the input biased exponent, bias is the standard bias for the decimal floating-point format (e.g., bias=398 in decimal64, bias=6176 in decimal128), and p is the precision of the decimal floating-point format.

In one or more embodiments of the invention, the master control hardware unit (115) increments the calculated exponent of the preliminary square-root (EPS) by one in response to an exponent increment flag (discussed below). In one or more embodiments of the invention, the master control hardware unit (115) calculates a difference between the number of trailing zeros in the rounded square root significand (discussed below) and one-half the number of trailing zeros in the significand provided by the input processing hardware unit (105). This difference corresponds to the right shift amount that should be applied to the rounded square-root significand (discussed below).

In one or more embodiments of the invention, the square-root hardware unit (110) is configured to: calculate a refined reciprocal square-root of the normalized significand ($S_N$) based on the initial reciprocal square-root ($X_0$); calculate an unrounded square-root of the normalized significand; and calculate a rounded square-root of the normalized significand.

Figure 3:
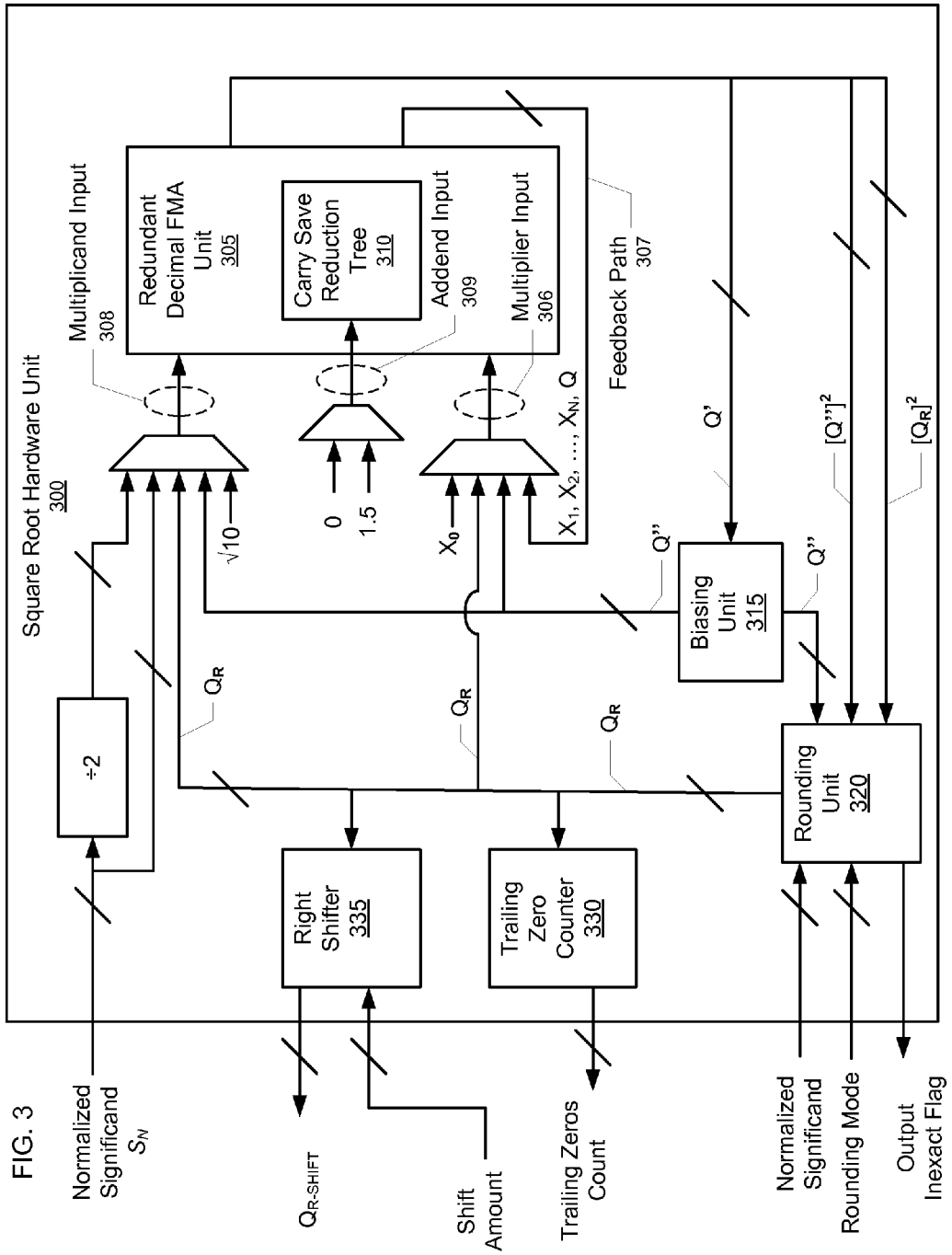
FIG. 3 shows a block diagram depicting a square-root hardware unit in accordance with one or more embodiments of the invention.

FIG. 3 shows a square-root hardware unit (300) in accordance with one or more embodiments of the invention. The square-root hardware unit (300) is an example implementation of the square root hardware unit (110), discussed above in reference to FIG. 1. As shown in FIG. 3, the square-root hardware unit (300) includes a redundant decimal (FMA) unit (305), a biasing unit (315), a rounding unit (320), a trailing zero counter (330), and a right shifter (335).

In one or more embodiments of the invention, the redundant decimal FMA unit (305) includes a multiplicand input (308), a multiplier input (306), and an addend input (309). One output of the redundant decimal FMA is connected to the multiplier input (306), effectively creating a feedback path (307). Moreover, the redundant decimal FMA unit (305) further includes a carry save reduction tree (310). As shown in FIG. 3, the addend input (309) injects a fixed addend of 0 or 1.5 into the carry save reduction tree (310). Although the feedback path (307) is shown as being external to the redundant decimal FMA unit (305) in FIG. 3, in alternative embodiments of the invention, the feedback path (307) may be internal to the redundant decimal FMA unit (305). The feedback path (307) may connect an output of the carry save reduction tree (310) to the multiplier input (306).

The redundant decimal FMA unit (305) is configured to generate a refined square-root reciprocal based on the initial square-root reciprocal ($X_0=1/\sqrt{S_N}$) and the normalized significand ($S_N$). Specifically, the redundant decimal FMA unit (305) is configured to execute multiple Newton-Raphson iterations for refining the initial square-root reciprocal ($X_0$), using the following equation:

$$X_{i+1} = \frac{X_i}{2}(3 - S_N \times X_i^2) = X_i\left(1.5 - \frac{S_N}{2} \times X_i^2\right), \qquad (2)$$

where $X_i$ is the approximated square-root reciprocal for the $i^{th}$ iteration. In one or more embodiments of the invention, the redundant decimal FMA unit (305) calculates equation (2) in three stages:

Stage 1: $0 + \frac{S_N}{2} \times X_i$

Stage 2: $1.5 - X_i \times \left(\frac{S_N}{2} \times X_i\right)$

Stage 3: $0 + X_i \times \left(1.5 - \frac{S_N}{2} \times X_i^2\right)$

In view of the above, the addend of 0 is selected for stage 1 and stage 3. In contrast, the addend of 1.5 is selected for stage 2. Those skilled in the art, having the benefit of this detailed description, will appreciate that the redundant decimal FMA unit (305) acts as a decimal fixed point multiplier in stage 1 and stage 3 (i.e., when the fixed addend is 0), while the redundant decimal FMA unit (305) acts as a decimal FMA in stage 2 (i.e., when the fixed addend is 1.5).

Those skilled in the art, having the benefit of this detailed description, will also appreciate that the output of stage 1, is the multiplier of stage 2. Similarly, the output of stage 2, is the multiplier of stage 3. In one or more embodiments of the invention, the redundant decimal FMA unit (305) accelerates the decimal fixed point multiplication and the FMA operation by keeping the outputs of stage 1 and stage 2 in a carry save (i.e., redundant) format. In a conventional multiplier/FMA, the final step of stage 1 and stage 2 includes a decimal carry propagation adder (DCPA) to generate the output. In contrast, the redundant decimal FMA unit (305) does not wait for the result of the DCPA, but instead takes the output of the carry save reduction tree (310) (i.e., in carry save format) (310) and returns the output(s) to the multiplier input (306) using the feedback path (307). In other words, the final carry propagate addition by the DCPA is removed from the critical path, and the outputs of stage 1 and stage 2 (i.e., the multipliers of stage 2 and stage 3, respectively) are kept in redundant form.

In one or more embodiments of the invention, the redundant decimal FMA unit (305) possesses a minimum of p+3 digits every stage. In such embodiments, the refined reciprocal square root is obtained after two iterations (X2) in the case of the decimal64 format, and after three iterations (X3) in the case of the decimal128 format. In one or more embodiments of the invention, the redundant decimal FMA unit (305) is as described in U.S. patent application Ser. No. 13/177,491 entitled "Parallel Redundant Decimal Fused-Multiply-Add Circuit," which was previously incorporated by reference in its entirety.

In one or more embodiments of the invention, once the refined reciprocal square-root ($X_N$) is calculated, the redundant decimal FMA unit (305) calculates the unrounded (i.e., preliminary) square-root of the normalized significand (Q) by multiplying the refined reciprocal square root ($X_N$) by the normalized significand ($S_N$) (i.e., $Q = X_N \times S_N$ = unrounded $\sqrt{S_N}$). As shown in FIG. 3, the redundant decimal FMA unit (305) accepts the normalized significand ($S_N$) via the multiplicand input (308) and accepts the reciprocal square root ($X_N$) in redundant form by the multiplier input (306). Those skilled in the art, having the benefit of this detailed description, will appreciate that the redundant decimal FMA unit (305) acts as a decimal fixed point multiplier when calculating the unrounded square-root of the normalized significand (Q) (i.e., the addend is 0).

In one or more embodiments of the invention, when the numerator of equation (1) is odd, the redundant decimal FMA unit (305) multiplies the unrounded square-root (Q) by $\sqrt{10}$. As shown in FIG. 3, the redundant decimal FMA unit (305) accepts the unrounded square root (Q) via the multiplier input (306) and accepts $\sqrt{10}$ via the multiplicand input (308). The product of Q and $\sqrt{10}$ may be labeled as Q'. However, when the numerator of equation (1) is even, the multiplication is not executed and Q'=Q. The DCPA (not shown) within the redundant decimal FMA unit (305) may calculate the non-redundant form of Q' in parallel with the redundant FMA. Those skilled in the art, having the benefit of this detailed description, will appreciate that the redundant decimal FMA unit (305) acts as a decimal fixed point multiplier when calculating Q' (i.e., the addend is 0).

In one or more embodiments of the invention, the biasing unit (315) inputs Q' and then calculates a sticky bit by ORing (i.e., performing an OR operation) on the least significant p+3 digits. If the sticky bit equals 1, the biasing unit (315) calculates Q" by adding a value of 10E(-p-1) to Q', and then truncating the result to (p+1) digits. However, if the sticky bit equals 0, the result is expected to be exact, and Q" is set to Q' (i.e., Q"=Q'). The DCPA (not shown) within the redundant decimal FMA unit (305) may calculate the non-redundant form of Q" in parallel with the redundant FMA. The biasing unit (315) forwards Q" to the rounding unit (320) and the redundant decimal FMA unit (305), and the redundant decimal FMA unit (305) calculates an estimated radicand $[Q"]^2$. As shown in FIG. 3, the redundant decimal FMA unit (305) accepts Q" via the multiplier input (306) and the multiplicand input (308). Those skilled in the art, having the benefit of this detailed description, will appreciate that the redundant decimal FMA unit (305) acts as a decimal fixed point multiplier when calculating $[Q"]^2$ (i.e., the addend is 0).

As shown in FIG. 3, the rounding unit (320) inputs a rounding mode, the normalized significand ($S_N$), Q", and the estimated radicand $[Q"]^2$. In one or more embodiments of the invention, the rounding unit (320) truncates the estimated radicand $[Q"]^2$ to p digits, and calculates a difference (i.e., a remainder) between the normalized significand ($S_N$) and the estimated radicand $[Q"]^2$ (i.e., remainder=$S_N - [Q"]^2$). If the remainder is zero and the least significant p-1 digits of the estimated radicand $[Q"]^2$ are zero, then Q' is exact. However, if (i) the remainder exceeds zero; or if (ii) the remainder equals zero and at least one of the least significant p-1 digits is non-zero (i.e., does not equal zero), a NotExact flag is raised by the rounding unit (320).

In one or more embodiments of the invention, the rounding unit (320) supports multiple rounding directions: Round to Nearest ties to even (RNE), Round away from zero (RAZ), Round towards zero (RTZ), Round towards positive infinity (RPI), Round towards minus infinity (RMI), Round to Nearest ties away from zero (RNA), and Round to Nearest ties toward zero (RNZ). The rounding direction is selected by the rounding mode input. Since there are no negative square-root results, RTZ is the same as RMI, and RAZ is the same as RPI. Also, since there is no half-way case, then RNA and RNZ are the same as RNE and combine to RN.

In one or more embodiments of the invention, the rounding unit (320) generates a rounded square-root ($Q_R$) based on the remainder, the NotExact flag, the rounding mode, Q", and a guard digit of Q". Specifically, the rounding unit (320) generates the rounded square-root ($Q_R$) by incrementing Q" by one (i.e., $Q_R=Q"+1$), decrementing Q" by one (i.e., $Q_R=Q"-1$), or not changing Q" (i.e., $Q_R=Q"$) depending on the remainder, the NotExact flag, the guard digit, and the rounding mode. FIG. 4 shows a rounding table (400) in accordance with one or more embodiments of the invention. The rounding table (400) sets forth the conditions for generating the rounded square-root ($Q_R$) by incrementing Q", decrementing Q", or not changing Q". For example, if the guard digit is 0, the remainder is 0, the NotExact flag is set, and the rounding mode is RMI, rounded square-root ($Q_R$)=Q"-1. The generated rounded square-root ($Q_R$) is forwarded to the trailing zero counter (330), the right shifter (335), and the redundant decimal FMA unit (305).

In one or more embodiments of the invention, the rounding unit (320) may generate an exponent increment flag if the unrounded square-root precision digits are all nine's and the rounding unit (320) takes the decision of rounding up. In such embodiments, the exponent calculated by the master control hardware unit (115), discussed above in reference to FIG. 1, in incremented.

In one or more embodiments of the invention, the trailing zero counter (330) counts the number of trailing zeros in the rounded square-root ($Q_R$), and forwards the trailing zeros count to the master control hardware unit (115), discussed above in reference to FIG. 1. As also discussed above, the master control hardware unit (115) calculates a difference between the number of trailing zeros in the rounded square root ($Q_R$), as provided by the trailing zero counter (330), and one-half the number of trailing zeros in the significand, as provided by the input processing hardware unit (105). This difference corresponds to the right shift amount that should be applied to the rounded square-root ($Q_R$). The right shifter (335) generates $Q_{R-SHIFT}$ by right shifting the rounded square-root ($Q_R$) by the shift amount provided by the master control hardware unit (115). In one or more embodiments of the invention, if the difference is less than or equal to zero, the right shift amount is zero.

In one or more embodiments of the invention, the redundant decimal FMA unit (305) calculates a square of the rounded square-root ($[Q_R]^2$). As shown in FIG. 3, the redundant decimal FMA unit (305) accepts $Q_R$ via the multiplier input (306) and the multiplicand input (308). Those skilled in the art, having the benefit of this detailed description, will appreciate that the redundant decimal FMA unit (305) acts as a decimal fixed point multiplier when calculating $[Q_R]^2$ (i.e., the addend is 0).

In one or more embodiments of the invention, the rounding unit (320) compares the normalized significand ($S_N$) with $[Q_R]^2$. If the two values are not identical, the rounding unit (320) raises the Output Inexact flag.

Referring back to FIG. 1, in one or more embodiments of the invention, the output formulation hardware unit (120) receives the rounded & shifted square-root (i.e., $Q_{R-SHIFT}$) from the square-root hardware unit (110) and the resultant exponent from the master control hardware unit (115). The output formulation hardware unit (120) may also receive the special square-root output from the input processing hardware unit (105) in the case of special decimal floating-point radicands. The output formulation hardware unit (120) is configured to generate a decimal floating-point square-root based on $Q_{R-SHIFT}$ and the resultant exponent, or the special square-root. As discussed above, decimal floating-point representations require a sign (i.e., +), a biased exponent (i.e., resultant exponent+bias), and a significand (e.g., $Q_{R-SHIFT}$). The quantity of bits required to represent the number depends on the specific decimal floating-point format being implemented. For example, 64 bits are required for the decimal64 format, while 128 bits are required for the decimal128 format. In one or more embodiments of the invention, the output formulation hardware unit (120) formulates the square-root result to conform with the IEEE Std 754-2008 decimal format.

Figure 5:
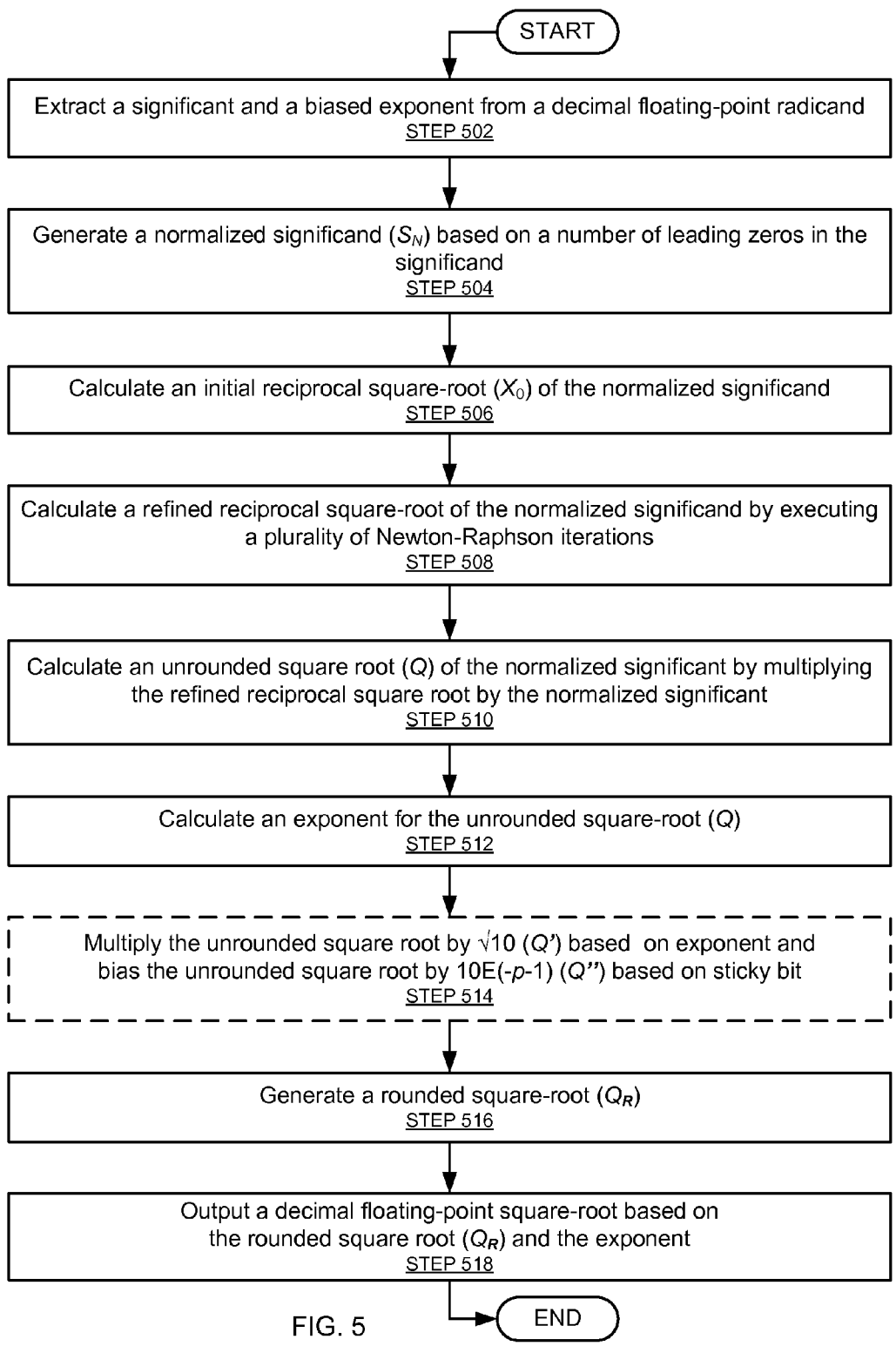
FIG. 5 shows a flowchart in accordance with one or more embodiments of the invention.

FIG. 5 shows a flowchart in accordance with one or more embodiments of the invention. The process shown in FIG. 5 may be executed using one or more of the components of the system (100), discussed above in reference to FIGS. 1-4. Moreover, the one or more steps in FIG. 5 may be repeated, omitted, and/or performed in parallel.

Initially, a significant (S) and a biased exponent are extracted from a decimal floating-point radicand (STEP 502). The extracted significand and the extracted biased exponent may be converted to binary coded decimal (BCD) format. As discussed above, decimal floating-point representations divide a number into a sign, a biased exponent, and a significand. The quantity of bits required to represent the number depends on the specific decimal floating-point format being implemented. For example, 64 bits are required for the decimal64 format, while 128 bits are required for the decimal128 format. The precision (p) of a decimal floating-point format corresponds to the size, in decimal digits, of the significand. For example, the decimal64 format includes a significand that is 16 decimal digits in size. Accordingly, the precision of the decimal64 format is 16 (i.e., p=16). Similarly, the decimal128 format includes a significand that is 34 decimal digits in size. Accordingly, the precision of the decimal128 format is 34 (i.e., p=34). Further, decimal floating-point formats may also be used to represent positive and negative infinity, and special "not a number" (NaN) values. In one or more embodiments of the invention, the decimal floating-point radicand conforms with the IEEE Std 754-2008 decimal format.

In STEP 504, a normalized significand ($S_N$|0.1≤$S_N$<1.0) is generated based on the number of leading zeros in the significand (S). Specifically, the normalized significand ($S_N$) is generated by left shifting the significand (S) to remove the leading zeros.

In STEP 506, an initial reciprocal square-root of the normalized significand is calculated (i.e., $X_0=1/\sqrt{S_N}$). The initial reciprocal square-root may be obtained/calculated using any method. In one or more embodiments of the invention, the initial reciprocal square-root of the normalized significand ($X_0$) is calculated by multiplying $C'=[A_M+(2/3)E(-k)]^{(-3/2)}$ by $B'=A_M$+nine's complement of $A_L/2$, where $A_M$ is the k most significant digits of the normalized significand, and where $A_L$ is the (p−k) least significant digits of the normalized significand. In one or more embodiments of the invention, k=4 and/or C' is retrieved from a lookup table.

In STEP 508, a refined reciprocal square-root ($X_N$) is calculated by executing a plurality of Newton-Raphson iterations. Specifically, the refined reciprocal square-root ($X_N$) is calculated according to the following equation:

$$X_{i+1} = \frac{X_i}{2}(3 - S_N \times X_i^2) = X_i\left(1.5 - \frac{S_N}{2} \times X_i^2\right), \quad (2)$$

where $X_i$ is the approximated square-root reciprocal for the $i^{th}$ iteration. In one or more embodiments of the invention, the multiple Newton-Raphson iterations are executed using a redundant decimal FMA unit, which calculates equation (2) in three stages:

Stage 1: $0 + \frac{S_N}{2} \times X_i$

Stage 2: $1.5 - X_i \times \left(\frac{S_N}{2} \times X_i\right)$

Stage 3: $0 + X_i \times \left(1.5 - \frac{S_N}{2} \times X_i^2\right)$

The redundant decimal FMA unit acts as a decimal fixed point multiplier in stage 1 and stage 3 (i.e., when the fixed addend is 0), while the redundant decimal FMA unit acts as a decimal FMA in stage 2 (i.e., when the fixed addend is 1.5). Those skilled in the art, having the benefit of this detailed description, will appreciate that the output of stage 1, is the multiplier of stage 2. Similarly, the output of stage 2, is the multiplier of stage 3. In one or more embodiments of the invention, the redundant decimal FMA unit accelerates the decimal fixed point multiplication and the FMA operation by keeping the outputs of stage 1 and stage 2 (i.e., multipliers of stage 2 and stage 3, respectively) in a carry save (i.e., redundant) format.

In one or more embodiments of the invention, the redundant decimal FMA unit possesses a minimum of p+3 digits every stage. In such embodiments, the refined reciprocal square root is obtained after two iterations ($X_2$) in the case of the decimal64 format, and after three iterations ($X_3$) in the case of the decimal128 format.

In STEP 510, an unrounded square-root (Q) is calculated by multiplying the normalized significand ($S_N$) by the refined reciprocal square-root ($X_N$) (i.e., $Q=S_N \times X_N$=unrounded $\sqrt{S_N}$). The unrounded square-root (Q) may be calculated using the redundant decimal FMA unit as a decimal fixed point multiplier.

In STEP 512, an exponent is calculated for the unrounded square-root (Q). Specifically, the exponent is calculated based on the number of leading zeros in the significand and the input biased exponent. In one or more embodiments of the invention, the exponent is calculated by the following:

$$EPS = \left\lfloor \frac{E_B - LZC + \text{bias} - p}{2} \right\rfloor, \quad (1)$$

where EPS is the exponent of the unrounded square-root, $E_B$ is the input biased exponent, bias is the standard bias for the decimal floating-point format (e.g., bias=398 in decimal64, bias=6176 in decimal128), and p is the precision of the decimal floating-point format.

In STEP 514, when the numerator of equation (1) is odd, the unrounded square-root (Q) is multiplied by $\sqrt{10}$. The product of Q and $\sqrt{10}$ may be labeled as Q'. However, when the numerator of equation (1) is even, the multiplication is not executed and Q'=Q.

Still referring to STEP 514, a sticky bit is calculated by ORing (i.e., performing an OR operation) on the least significant p+3 digits of Q'. If the sticky bit equals 1, a value of 10E(−p−1) is added to Q' (i.e., Q"=Q'+10E(−p−1)), and the result is truncated to (p+1) digits. However, if the sticky bit equals 0, the result is expected to be exact, and Q" is set to Q' (i.e., Q"=Q') and truncated to (p+1) digits.

In one or more embodiments of the invention, a difference (i.e., remainder) is calculated between the normalized significand ($S_N$) and the estimated radicand $[Q"]^2$ (i.e., remainder=$S_N-[Q"]^2$). If the remainder is zero and the least significant p−1 digits of the estimated radicand $[Q"]^2$ are zero, then Q" is exact. However, if (i) the remainder exceeds zero; or if (ii) the remainder equals zero and at least one of the least significant p–1 digits is non-zero (i.e., does not equal zero), a NotExact flag is raised by the rounding unit (320).

In STEP 516, a rounded square-root ($Q_R$) is generated based on the remainder, the NotExact flag, a rounding mode (e.g., RNE, RAZ, RTZ, RPI, RNI, RNA, RNZ), Q", and a guard digit of Q". Specifically, the rounded square-root ($Q_R$) is generated by incrementing Q" by one (i.e., $Q_R$=Q"+1), decrementing Q" by one (i.e., $Q_R$=Q"–1), or not changing Q" (i.e., $Q_R$=Q"), depending on the remainder, the NotExact flag, the guard digit, and the rounding mode. The rounding table (400), discussed above in reference to FIG. 4, sets forth the conditions for generating the rounded square-root ($Q_R$) by incrementing Q", decrementing Q", or not changing Q".

In one or more embodiments of the invention, the normalized significand ($S_N$) is compared with $[Q_R]^2$. If the two values are not identical, an Output Inexact flag is raised. In one or more embodiments of the invention, the rounded square-root ($Q_R$) is right shifted by a difference between the number of trailing zeros in the rounded square root significand and one-half the number of trailing zeros in the significand. However, if the difference equals zero or if the difference is less than zero (i.e., difference≤0), the shift amount is zero.

In STEP 518, a decimal floating-point square-root based on the rounded square-root ($Q_R$) and the exponent is output. As discussed above, decimal floating-point representations require a sign (i.e., +), a biased exponent (i.e., resultant exponent+bias), and a significand (e.g., $Q_R$ after right shifting). The quantity of bits required to represent the number depends on the specific decimal floating-point format being implemented. For example, 64 bits are required for the decimal64 format, while 128 bits are required for the decimal128 format. In one or more embodiments of the invention, the output decimal floating-point square-root conforms with the IEEE Std 754-2008 decimal format.

FIG. 6 shows two worked examples (i.e., Example 1 (605), Example 2 (610)) in accordance with one or more embodiments of the invention.

The system(s) and processes described in this detailed description may be used in any application requiring decimal calculations, including (but not limited to) applications of: finance, taxation, investments, transportation, commerce, energy consumption, energy pricing/purchasing, etc.

Figure 7:
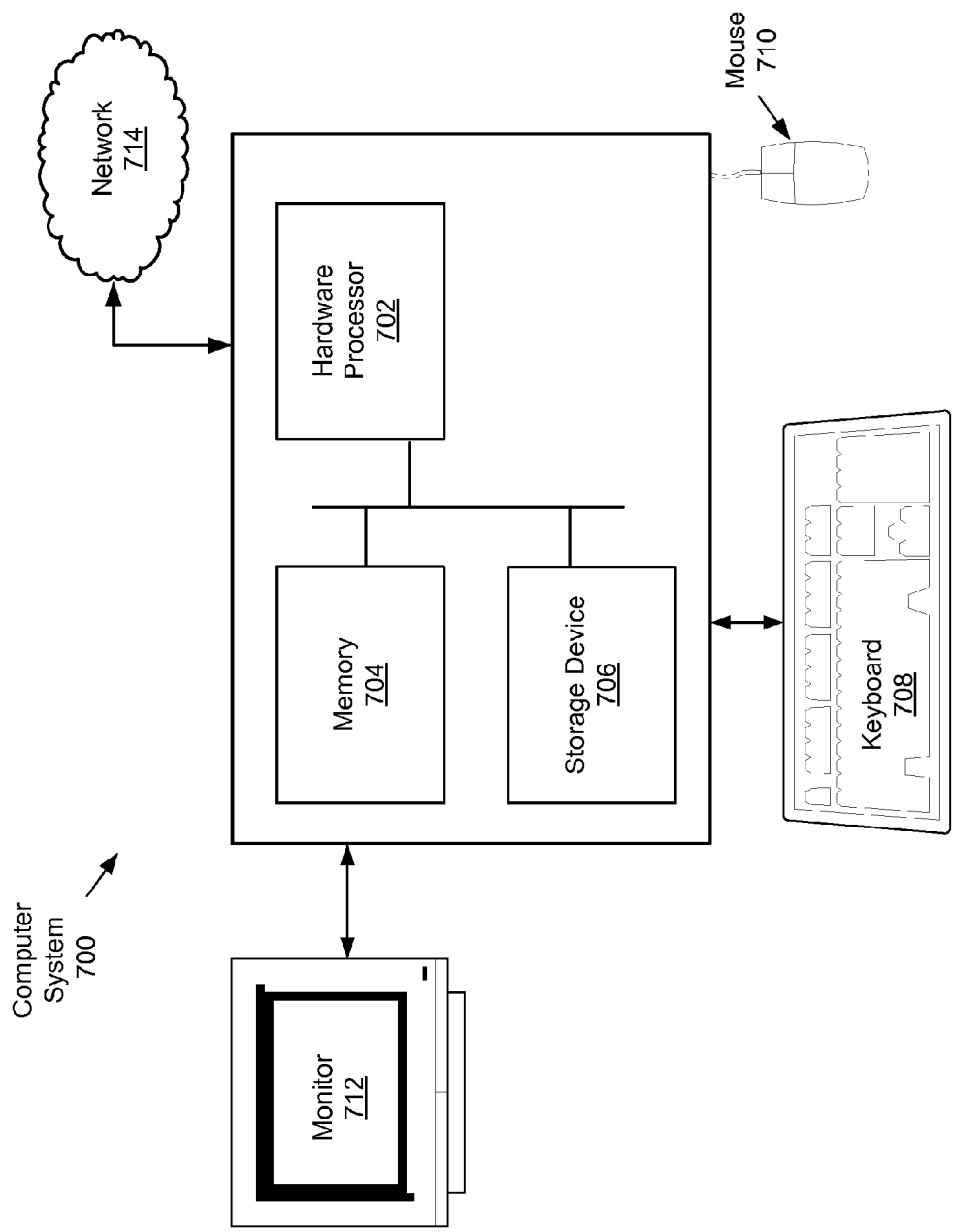
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more hardware processor(s) (702) (such as a central processing unit (CPU), integrated circuit, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   extracting a significand and a biased exponent from a decimal floating-point radicand;
   generating a normalized significand based on a number of leading zeros in the significand;
   calculating, using a redundant decimal fused-multiply and add (FMA) unit comprising circuitry, a refined reciprocal square-root of the normalized significand using a plurality of Newton-Raphson iterations;
   calculating, using the redundant decimal FMA unit, an unrounded square-root of the normalized significant by multiplying the refined reciprocal square-root by the normalized significant;
   generating a rounded square root based on a first difference between the normalized significand and a square of the unrounded square-root calculated using the redundant decimal FMA unit;
   calculating an exponent for the unrounded square-root based on the number of leading zeros, a bias of the decimal floating-point radicand, and a precision (p) of the decimal floating-point radicand; and
   outputting a decimal floating-point square-root of the radicand based on the rounded square root and the exponent.

2. The method of claim 1, further comprising:
   multiplying, in response to the exponent being an odd number and using the redundant decimal FMA unit, the unrounded square-root by the positive square-root of ten.

3. The method of claim 1, further comprising:
   calculating a sticky bit by performing an OR operation on the least significant p+3 digits of the unrounded square-root; and
   adding, in response to the sticky bit equaling one, a bias of 10E(–p–1) to the unrounded square-root.

4. The method of claim 1, further comprising:
raising a NotExact flag in response to the first difference exceeding zero or the first difference equaling zero and at least one of the least significant p−1 digits not equaling zero,
wherein generating the rounded square-root is further based on the NotExact flag.

5. The method of claim 1, further comprising:
identifying a number of trailing zeros in the significand;
identifying a number of trailing zeros in the rounded square root;
calculating a second difference between the number of trailing zeros in the rounded square-root and one-half the number of trailing zeros in the significand; and
right shifting, in response to the second difference being positive, the rounded square-root by the second difference.

6. The method of claim 5, further comprising:
calculating, using the redundant decimal FMA unit, a square of the rounded square-root;
calculating a second difference between the rounded square-root and the normalized significand; and
raising an output inexact flag in response to the second difference not equaling zero.

7. The method of claim 1, wherein the bias is 398, and wherein the precision is 16.

8. The method of claim 1, further comprising:
identifying the k most significant digits of the normalized significand;
obtaining a value from a lookup table by inputting the k most significant digits into the lookup table;
identifying the p−k least significant digits of the normalized significand;
calculating the nine's complement of one half the p−k least significant digits of the normalized significand;
calculating a sum by adding the k most significant digits to the nine's complement of one half the p−k least significant digits; and
calculating an initial square root reciprocal for the plurality of Newton-Raphson iterations by multiplying the sum with the value from the lookup table.

9. The method of claim 1, wherein calculating the refined reciprocal square-root comprises:
calculating, during a first iteration of the plurality of iterations and using the redundant decimal FMA unit, a first multiplier in a carry save format by multiplying one-half the normalized significand with an initial reciprocal square-root;
calculating, during the first iteration and using the redundant decimal FMA unit, a second multiplier in the carry save format by multiplying the first multiplier with the initial reciprocal square-root and inserting, as an input vector, an addend of 1.5 to be added to a plurality of partial products using a carry save reduction tree;
calculating, during the first iteration and using the redundant decimal FMA unit, a third multiplier in the carry save format by multiplying the second multiplier with the initial reciprocal square-root; and
calculating, during a second iteration of the plurality of iterations and using the redundant decimal FMA unit, a fourth multiplier in the carry save format by multiplying one-half the normalized significand with the third multiplier.

10. A system, comprising:
an input processing hardware unit configured to:
extract a significant and a bias exponent from the decimal floating-point radicand;
calculate a normalized significand from the significand; and
calculate an initial reciprocal square-root of the normalized significand;
a square root hardware unit comprising a redundant decimal fused-multiply and add (FMA) unit and configured to:
calculate, using the redundant decimal FMA unit, a refined reciprocal square-root of the normalized significand using a plurality of Newton-Raphson iterations;
calculate, using the redundant decimal FMA unit, an unrounded square-root of the normalized significand by multiplying the refined reciprocal square-root by the normalized significand; and
generate a rounded square-root based on a first difference between the normalized significand and a square of the unrounded square-root calculated using the redundant decimal FMA unit;
a master control hardware unit operatively connected to the input processing hardware unit and the square-root hardware unit and configured to calculate an exponent for the unrounded square-root based on the number of leading zeros, a bias of the decimal floating-point radicand, and a precision (p) of the decimal floating-point radicand; and
an output formulation hardware unit configured to output a decimal floating-point square-root of the radicand based on the rounded square-root and the exponent.

11. The system of claim 10 wherein the bias is 398, and wherein the precision is 16.

12. The system of claim 10, wherein the input processing hardware unit comprises:
a counter unit to identify at least one selected from a group consisting of a number of leading zeros in the significant and a number of trailing zeros in the significant;
a shifter unit for calculating the normalized significand by shifting the significand by the number of leading zeros; and
an initial reciprocal generation unit for calculating the initial reciprocal square-root of the normalized significand.

13. The system of claim 12, wherein the initial reciprocal generation unit comprises:
a partitioning unit configured to identify the k most significant digits of the normalized significand and to identify the p−k least significant digits of the normalized significand;
a nine's complement unit configured to calculate the nine's complement of one half the p−k least significant digits of the normalized significand;
a summation unit configured to sum the nine's complement and the k most significant digits;
a lookup table configured to output a value in response to an input of the k most significant digits of the normalized significand; and
a decimal fixed-point multiplier unit for calculating the initial reciprocal square root by multiplying the value and the sum.

14. The system of claim 10, wherein the square-root hardware unit further comprises a biasing unit configured to:
calculate a sticky bit by performing an OR operation on the least significant p+3 digits of the unrounded square-root; and
add, in response to the sticky bit equaling one, a bias of 10E(−p−1) to the unrounded square-root.

15. The system of claim 10, wherein the square-root hardware unit further comprises:

a rounding unit for generating the rounded square-root and configured to raise a NotExact flag in response to the first difference exceeding zero or the first difference equaling zero and at least one of the least significant p−1 digits not equaling zero.

16. The system of claim 10, wherein the master control hardware unit is further configured to:
- obtain a number of trailing zeros in the significand;
- obtain a number of trailing zeros in the rounded square-root; and
- calculate a second difference between the number of trailing zeros in the rounded square root and on-half the number of trailing zeros in the significand.

17. The system of claim 16, wherein the square-root hardware unit further comprises:
- a right shifter unit configured to right shift the rounded square-root by the second different in response to the second difference being positive.

18. The system of claim 10, wherein the redundant decimal FMA comprises:
- a multiplicand input;
- a multiplier input;
- a carry save reduction tree; and
- a feedback path connecting an output of the carry save reduction tree to the multiplier input.

19. The system of claim 18, wherein the redundant decimal FMA unit is configured to:
- calculate, during a first iteration of the plurality of iterations, a first multiplier in a carry save format by multiplying one-half the normalized significand with an initial reciprocal square-root;
- calculate, during the first iteration, a second multiplier in the carry save format by multiplying the first multiplier with the initial reciprocal square-root and inserting, as an input vector, an addend of 1.5 to be added to a plurality of partial products using the carry save reduction tree;
- calculate, during the first iteration and using the redundant decimal FMA unit, a third multiplier in the carry save format by multiplying the second multiplier with the initial reciprocal square-root; and
- calculate, during a second iteration of the plurality of iterations and using the redundant decimal FMA unit, a fourth multiplier in the carry save format by multiplying one-half the normalized significand with the third multiplier.

20. The system of claim 19, wherein the redundant decimal FMA unit is further configured to multiply, in response to the exponent being an odd number, the unrounded square root by the positive square-root of ten.

* * * * *